United States Patent
Kim et al.

(10) Patent No.: US 9,100,552 B2
(45) Date of Patent: Aug. 4, 2015

(54) TERMINAL AND METHOD FOR OUTPUTTING SIGNAL INFORMATION OF A SIGNAL LIGHT IN THE TERMINAL

(75) Inventors: Yongsung Kim, Seongnam-Si (KR); Haejin Cho, Seoul (KR); Sangyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 13/561,961

(22) Filed: Jul. 30, 2012

(65) Prior Publication Data

US 2013/0033601 A1 Feb. 7, 2013

(30) Foreign Application Priority Data

Aug. 2, 2011 (KR) .................. 10-2011-0077132

(51) Int. Cl.
*H04N 7/18* (2006.01)
*G06K 9/00* (2006.01)
*H04N 21/414* (2011.01)

(52) U.S. Cl.
CPC .............. *H04N 7/18* (2013.01); *G06K 9/00825* (2013.01); *H04N 21/41422* (2013.01)

(58) Field of Classification Search
USPC .......... 348/148, 137, 142, 151, 14.02, 33, 47, 348/64, 208.16, 211.8, 211.13, 227.1, 348/228.1, 230.1, 231.99, 236, 237, 294, 348/297, 349, 364, 391.1, 457, 582, 813; 701/2, 53, 93, 117, 119, 444, 460; 382/311, 312; 340/7.33, 425.5, 435, 340/438, 475, 641, 815.66, 906, 932
See application file for complete search history.

(56) References Cited

U.S. PATENT DOCUMENTS

| | | | | |
|---|---|---|---|---|
| 5,517,678 | A * | 5/1996 | Klank et al. | 455/182.2 |
| 6,448,904 | B1 * | 9/2002 | Flores | 340/906 |
| 8,477,022 | B2 * | 7/2013 | Taguchi et al. | 340/439 |
| 2001/0033735 | A1 * | 10/2001 | Park | 386/46 |
| 2004/0058367 | A1 * | 3/2004 | Matsui et al. | 435/6 |
| 2004/0075544 | A1 * | 4/2004 | Janssen | 340/435 |
| 2004/0114381 | A1 * | 6/2004 | Salmeen et al. | 362/465 |
| 2005/0083191 | A1 * | 4/2005 | Levin | 340/475 |
| 2005/0228569 | A1 * | 10/2005 | Michi et al. | 701/93 |
| 2007/0071450 | A1 * | 3/2007 | Schatz et al. | 398/162 |
| 2008/0126807 | A1 * | 5/2008 | Choi et al. | 713/176 |
| 2008/0204412 | A1 * | 8/2008 | On et al. | 345/160 |
| 2009/0185763 | A1 * | 7/2009 | Park et al. | 382/311 |

(Continued)

FOREIGN PATENT DOCUMENTS

| | | |
|---|---|---|
| KR | 10-1998-028815 A | 7/1998 |
| KR | 10-2005-0073804 A | 7/2005 |

(Continued)

*Primary Examiner* — Jefferey Harold
*Assistant Examiner* — Mustafizur Rahman
(74) *Attorney, Agent, or Firm* — Birch, Stewart, Kolasch & Birch, LLP

(57) ABSTRACT

The present disclosure relates to a terminal, including an output unit; an image sensor configured to capture an image; and a controller functionally connected to the output unit and the image sensor. The controller controls to recognize a signal light on an image captured by the image sensor, and output the signal information of the recognized signal light through the output unit. The signal information includes at least one of a signal state of the signal light, a signal change expected time, an expected time required to pass through a signal light from a current location, and an expected signal change frequency.

16 Claims, 7 Drawing Sheets

(56) References Cited

U.S. PATENT DOCUMENTS

| | | | |
|---|---|---|---|
| 2009/0210157 A1* | 8/2009 | Lee | 701/301 |
| 2010/0274414 A1* | 10/2010 | Park | 701/2 |
| 2011/0109726 A1* | 5/2011 | Hwang et al. | 348/47 |
| 2011/0180794 A1* | 7/2011 | Yamazaki | 257/43 |
| 2012/0045215 A1* | 2/2012 | Kim et al. | 398/128 |

FOREIGN PATENT DOCUMENTS

| | | |
|---|---|---|
| KR | 10-0930508 B1 | 12/2009 |
| KR | 10-2011-0056166 A | 5/2011 |

\* cited by examiner

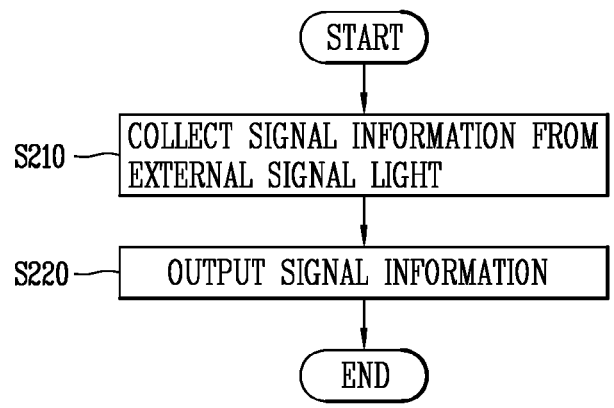
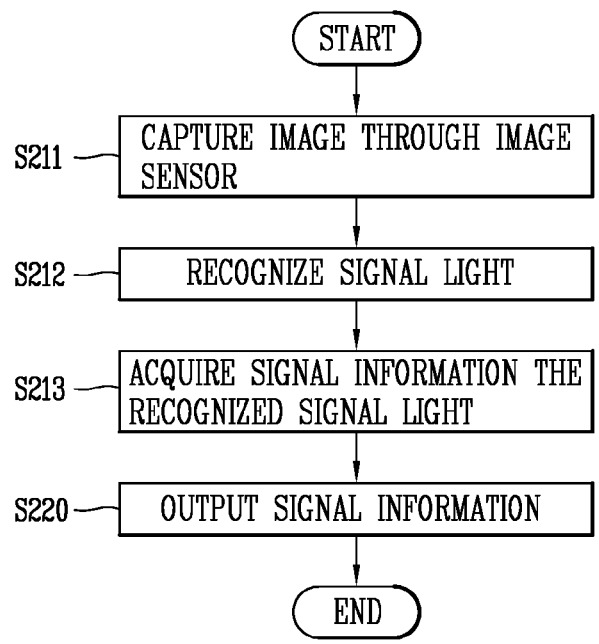

1

TERMINAL AND METHOD FOR OUTPUTTING SIGNAL INFORMATION OF A SIGNAL LIGHT IN THE TERMINAL

CROSS REFERENCE TO RELATED APPLICATION

Pursuant to 35 U.S.C. §119(a), this application claims the benefit of earlier filing date and right of priority to Korean Application No. 10-2011-0077132, filed on Aug. 2, 2011, the contents of which is incorporated by reference herein in its entirety.

BACKGROUND OF THE INVENTION

1. Field of the Invention

The present disclosure relates to a terminal, and more particularly, to a method and terminal for outputting the signal information of a signal light in the terminal.

2. Description of the Related Art

When vehicles are waiting at a signal light, a lot of drivers watch DMB. However, DMB navigation used in the related art does not have a signal light recognition function and thus vehicle drivers should check a signal while alternately viewing the signal light and DMB. In other words, drivers continue to pay attention to a signal light because they do not know when the signal light is changed to a green light (or left turn).

Furthermore, when the driver misses a changed signal while watching DMB and waits at the signal light for a long period of time or makes a delayed response, he or she may be criticized by a driver in the rear car.

SUMMARY OF THE INVENTION

An object of the present disclosure is to provide a method for outputting the signal information of a signal light located outside to a terminal or mobile terminal provided in a vehicle using a camera and/or wireless communication scheme.

Furthermore, another object of the present disclosure is to provide a method for automatically displaying a DMB screen or turning off the displayed DMB screen on a terminal device provided in a vehicle using the signal information of a signal light.

In addition, still another object of the present disclosure is to provide a method for linking the signal information of a signal light with an Idle Stop & Go (ISG) function.

According to the present disclosure, there is provided a terminal including an output unit; an image sensor configured to capture an image; and a controller functionally connected to the output unit and the image sensor, wherein the controller controls to recognize a signal light on an image captured by the image sensor, and output the signal information of the recognized signal light through the output unit, and the signal information includes at least one of a signal state of the signal light, a signal change expected time, an expected time required to pass through a signal light from a current location, and an expected signal change frequency.

Furthermore, according to the present disclosure, the terminal may further include a radio frequency (RF) communication unit, wherein the controller controls to receive the signal information or the remaining information except the signal state of the signal light within the signal information through the RF communication unit.

Furthermore, the terminal may be characterized in that the signal information received through the RF communication unit is received through a visible light communication scheme.

Furthermore, the terminal may be characterized in that the signal state of the signal light indicates a stop signal and/or a start signal, and the start signal is a left turn signal, a U-turn signal, or a straight ahead signal.

Furthermore, the terminal may be characterized in that the controller controls an Idle Stop and Go (ISG) function to be activated when the signal state of the signal light indicates a stop signal.

Furthermore, the terminal may be characterized in that the controller controls the image sensor to be activated when the Idle Stop and Go (ISG) function is on.

Furthermore, according to the present disclosure, the terminal may further include a sensing unit configured to sense the moving state of a vehicle, wherein the sensing unit is functionally connected to the controller, and the controller controls the output unit to output the signal information by considering the moving state of a vehicle sensed through the sensing unit.

Furthermore, the terminal may be characterized in that the moving state of a vehicle is a stopped state, a slow moving state, or a moving state.

Furthermore, the terminal may be characterized in that the controller controls the output unit to output the signal information when the moving state of a vehicle is a stopped state.

Furthermore, the terminal may be characterized in that the controller controls an image to be outputted on the output unit, and the signal information is outputted together with the output image.

Furthermore, the terminal may be characterized in that the controller controls the output unit to turn off the output image and signal information when the moving state of a vehicle is a moving state.

Furthermore, the terminal may be characterized in that the controller controls the RF communication unit to receive the signal information through the RF communication unit when a predetermined condition is satisfied.

Furthermore, the terminal may be characterized in that the predetermined condition is a case where any signal light cannot be recognized through the image sensor.

Furthermore, the terminal may be characterized in that the controller controls the output unit to output the signal information at the top, bottom, left, right or center of the output image.

Furthermore, the terminal may be characterized in that the terminal is a navigation device, a laptop, a mobile device, Personal Digital Assistants (PDAs), a Portable Multimedia Player (PMP) or a tablet PC.

Furthermore, the terminal may be characterized in that the controller controls the output unit to output the signal information in a visual, auditory or tactile manner.

Furthermore, the terminal may be characterized in that when a plurality of signal lights are recognized through the image sensor, the controller controls the output unit to output the signal information of one of the plurality of signal lights based on the distance and/or direction with respect to the signal lights.

Furthermore, according to the present disclosure, there is provided a method for controlling the signal information of a signal light located outside to be outputted on a terminal, and the method may include capturing an image containing the signal light; sensing the signal light from the captured image; and outputting the signal information of the sensed signal light.

Furthermore, according to the present disclosure, the method may further include receiving the signal information of the sensed signal light, wherein the signal information includes at least one of a signal state of the signal light, a signal change expected time, an expected time required to reach the signal light, and an expected signal change frequency.

Furthermore, according to the present disclosure, the method may further include sensing the moving state of a vehicle, wherein the signal information of a signal light is outputted based on the sensed moving state of a vehicle.

Furthermore, the method may be characterized in that the signal information is received through a visible light communication scheme.

According to the present disclosure, the signal information of a signal light located outside may be outputted to a terminal or mobile terminal provided in a vehicle using a camera and/or wireless communication scheme, thereby having an effect of allowing a vehicle driver to easily recognize a signal of the signal light.

Furthermore, according to the present disclosure, a DMB screen may be displayed or the displayed DMB screen may be turned off in an automatic manner on a terminal device provided in a vehicle using the signal information of a signal light, thereby having an effect of assisting a vehicle driver to drive safely.

Furthermore, according to the present disclosure, there is provided a method for linking the signal information of a signal light with an Idle Stop & Go (ISG) function, thereby having an effect of improving the fuel efficiency of a vehicle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B are flow charts illustrating a method for outputting the signal information of a signal light located outside according to an embodiment of the present disclosure;

DETAILED DESCRIPTION OF THE INVENTION

Hereinafter, a terminal associated with the present disclosure will be described in detail with reference to the accompanying drawings. A suffix "module" or "unit" used for constituent elements disclosed in the following description is merely intended for easy description of the specification, and the suffix itself does not give any special meaning or function.

A terminal disclosed herein may include a portable phone, a smart phone, a laptop computer, a digital broadcast terminal, Personal Digital Assistant (PDAs), a portable multimedia player (PMP), a navigation device, and the like.

Figure 1A:
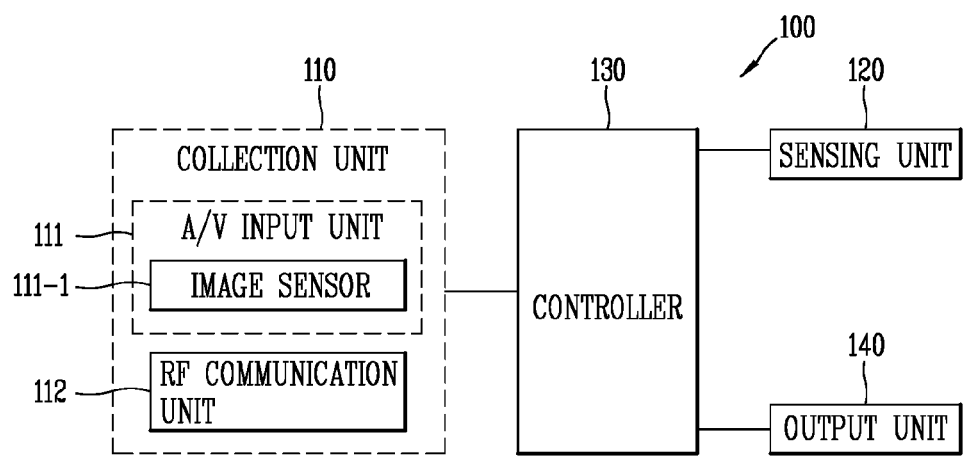
FIGS. 1A and 1B are block diagrams illustrating a terminal to which an embodiment of the present disclosure is applicable.
Figure 1B:
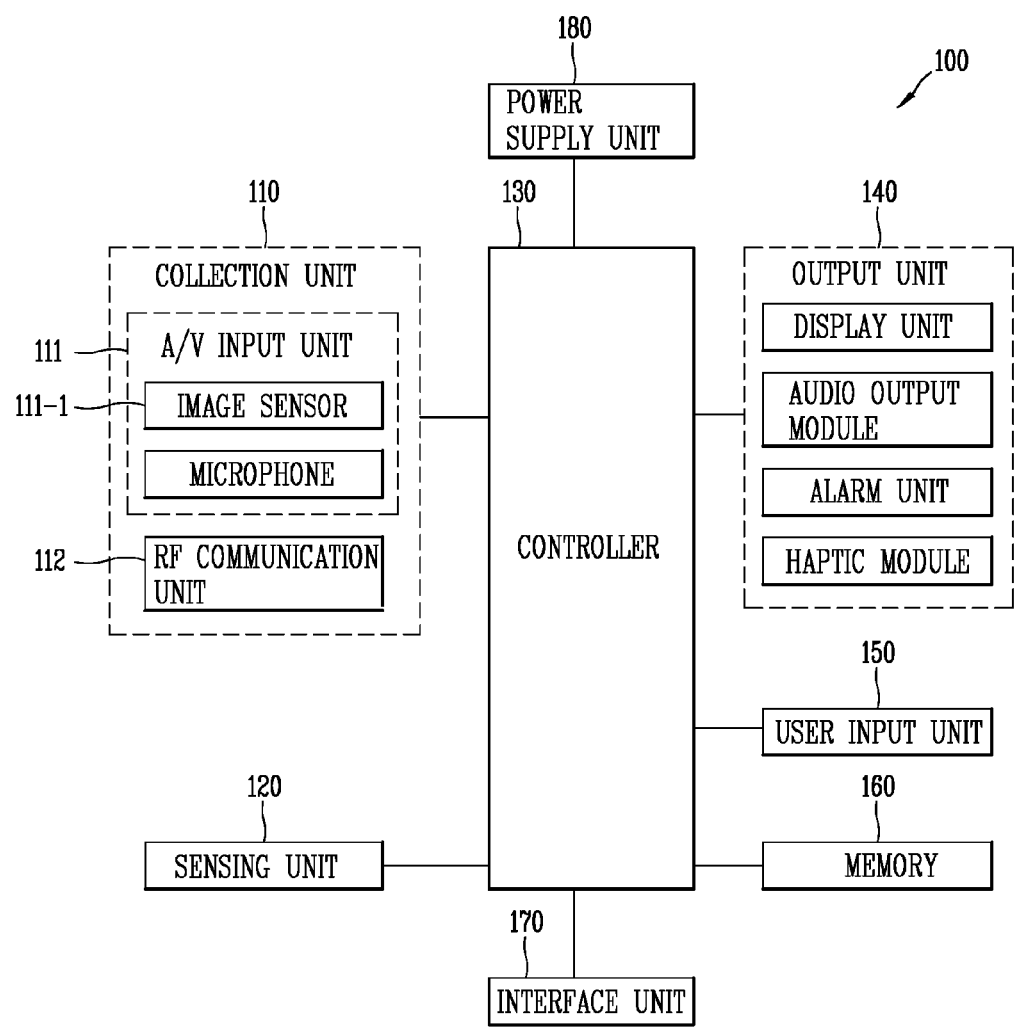

FIGS. 1A and 1B are block diagrams illustrating a terminal to which an embodiment of the present disclosure is applicable.

The terminal 100 may include a collection unit 110, a sensing unit 120, a controller 130, and an output unit 140.

The constituent elements as illustrated in FIG. 1A correspond to constituent elements to which an embodiment of the present disclosure is applicable, but the terminal may be implemented with greater or less number of elements than those illustrated elements (refer to FIG. 1B).

Hereinafter, the constituent elements will be described in sequence.

The collection unit 110 collects the signal information of a signal device located outside. Here, the signal device may refer to a signal light as a device for controlling the traffic of a road. Here, it may be referred to as a "signal light".

Here, the signal information may include a signal state of the signal light, a signal change expected time, an expected time required to pass through a signal light, and an expected signal change frequency. Furthermore, the signal state of the signal light may indicate a stop signal and/or a start signal, and the start signal may be a left turn signal, a U-turn signal, or a straight ahead signal.

The collection unit 110 may include at least one of a RF communication unit 112 and an A/V input unit 111.

First, the RF communication unit 112 may include one or more modules allowing wireless communication between the terminal 100 and a wireless communication system or allowing wireless communication between the terminal 100 and a network in which the terminal 100 is located. For example, the RF communication unit 112 may include a broadcast receiving module, a mobile communication module, a wireless Internet module, a short-range communication module, a location information module, and the like.

The broadcast receiving module receives broadcast signals and/or broadcast associated information from an external broadcast management server through a broadcast channel.

The broadcast channel may include a satellite channel and a terrestrial channel. The broadcast management server may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be also provided via a mobile communication network. In this case, the broadcast associated information may be received by the mobile communication module.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module may be configured to receive digital broadcast signals transmitted from various types of broadcast systems. Such broadcast systems may include Digital Multimedia Broadcasting-Terrestrial (DMB- T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module may be configured to be suitable for every broadcast system transmitting broadcast signals as well as the digital broadcasting systems.

Broadcast signals and/or broadcast associated information received via the broadcast receiving module may be stored in a memory 160.

The mobile communication module transmits and/or receives wireless signals to and/or from at least one of a base station, an external terminal, and a server on a mobile communication network. Here, the wireless signals may include audio call signal, video (telephony) call signal, or various formats of data according to the transmission/reception of text/multimedia messages.

The wireless internet module denotes a module for wireless Internet access. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module denotes a module for short-range communications. Suitable technologies for implementing this module may include Bluetooth, Radio Frequency Identification (RFID), Infrared Data Association (IrDA), visible light communication, Ultra Wideband (UWB), ZigBee, and the like.

The position location module denotes a module for acquiring the location of a terminal. An representative example of the position location module may include a Global Position System (GPS) module.

Referring to FIG. 1A, the A/V input unit 111 is configured to provide audio or video signal input to the terminal. The A/V input unit may include an image sensor 111-1, a microphone, and the like. The camera receives and processes image frames such as still or moving images obtained by image sensors in a video call mode or a capturing mode. The processed image frames may be displayed on a display unit. Here, the image sensor may be used in the meaning similar to a camera, or may be used in the meaning broader than a camera.

The image frames processed by the camera may be stored in the memory 160 or transmitted to the exterior via the RF communication unit 112. Two or more cameras may be provided according to the configuration of the portable terminal.

The microphone may receive an external audio signal while the portable terminal is in a particular mode, such as a phone call mode, a recording mode, a voice recognition mode, or the like. This audio signal is processed into digital data. The processed digital data is converted for output into a format transmittable to a mobile communication base station via the mobile communication module in case of the phone call mode. The microphone may include assorted noise removing algorithms to remove noise generated in the course of receiving the external audio signal.

The sensing unit may sense a current status of the terminal 100 such as an open/close status of the terminal 100, a location of the terminal 100, a presence or absence of user contact, a direction of the terminal, acceleration/deceleration of the terminal, and the like, to generate a sensing signal for controlling the operation of the terminal 100. For example, when the terminal 100 is a slide-type terminal, the sensing unit may sense whether a sliding portion of the terminal is open or closed. Also, the sensing unit may sense the presence or absence of power provided by the power supply unit 180, the presence or absence of a coupling between the interface unit 170 and an external device, and the like. Meanwhile, the sensing unit 120 may include a proximity sensor.

The output unit 140 is configured to output an audio signal, a video signal or a tactile signal. The output unit may include a display unit, an audio output module, an alarm, a haptic module, and the like. In other words, the output unit 140 may output the signal information of a signal light in a visual, auditory or tactile manner.

The display unit may output information processed in the terminal 100. For example, when the terminal is operated in a phone call mode, the display unit will provide a User Interface (UI) or a Graphic User Interface (GUI) which includes information associated with the call. When the terminal 100 is in a video call mode or a capture mode, the display unit may display images captured and/or received, UI, or GUI.

The display unit may include at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays may be configured with a transparent type or an optical transparent type through which the exterior is visible. The display may be referred to as a transparent display. A representative example of the transparent display may include a Transparent OLED (TOLED), and the like. The rear surface of the display unit may also be implemented to be optically transparent. Under this configuration, a user can view an object positioned at a rear side of the terminal body through a region occupied by the display unit of the terminal body.

Two or more display units may exist according to the implementation type of the terminal 100. For instance, a plurality of the display units may be arranged on one surface to be spaced apart from or integrated with each other, or may be arranged on different surfaces.

When the display unit and a touch sensitive sensor (hereinafter, referred to as a "touch sensor") have a layered structure therebetween (hereinafter, referred to as a "touch screen", the display unit may be used as an input device rather than an output device. The touch sensor may be implemented as a touch film, a touch sheet, a touch pad, and the like.

The touch sensor may be configured to convert changes of a pressure applied to a specific part of the display unit, or a capacitance occurring from a specific part of the display unit, into electric input signals. The touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits the corresponding data to the controller 130. Accordingly, the controller 130 may sense which region of the display unit has been touched.

A proximity sensor may be arranged at an inner region of the terminal covered by the touch screen, or adjacent to the touch screen. The proximity sensor denotes a sensor to sense presence or absence of an object approaching to a surface to be sensed, or an object existing adjacent to a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity of a pointer to the touch screen is sensed by changes of an electromagnetic field. In this case, the touch screen (touch sensor) may be categorized into a proximity sensor.

Hereinafter, for the sake of brief explanation, a behavior that the pointer is positioned to be proximate onto the touch screen without contact will be referred to as "proximity touch", whereas a behavior that the pointer substantially comes in contact with the touch screen will be referred to as "contact touch". A position corresponding to the proximity touch of a pointer on the touch screen denotes a position where the pointer vertically faces the touch screen upon the proximity touch of the pointer.

The proximity sensor senses proximity touch, and proximity touch patterns (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module may output audio data received from the RF communication unit 112 or stored in the memory 160, in a call-receiving mode, a call-placing mode, a recording mode, a voice recognition mode, a broadcast reception mode, and the like. The audio output module may output audio signals relating to functions performed in the terminal 100 (e.g., sound alarming a call received or a message received, etc.) The audio output module may include a receiver, a speaker, a buzzer, and the like.

The alarm unit outputs a signal for notifying the generation of an event of the terminal 100. The events generated from the terminal may include call received, message received, key signal input, touch input, and the like. The alarm unit may output not only video or audio signals, but also other types of signals such as signals notifying the occurrence of an event in a vibration manner. Since the video or audio signals can be output through the display unit or the audio output unit, they may be categorized into a part of the alarm.

The haptic module generates various tactile effects which a user can feel. A representative example of the tactile effects generated by the haptic module includes vibration. The intensity and pattern of vibration generated by the haptic module may be controlled. For instance, different vibrations may be output in a combined or sequential manner.

The haptic module may generate various tactile effects, including not only vibration, but also arrangement of pins vertically moving with respect to a skin being touched, air injection force or air suction force through an injection hole or a suction hole, touch by a skin surface, contact to an electrode, effects by stimulus such as an electrostatic force, reproduction of cold or hot feeling using a heat absorbing device or a heat emitting device, and the like. The haptic module may be configured to transmit tactile effects through a direct contact, or a user's muscular sense using a finger or hand. Two or more haptic modules may be implemented according to the configuration of the terminal 100.

The controller 130 typically controls the overall operations of a terminal.

For example, the control or processing related to a voice call, data communication, a video call, and the like may be carried out.

The controller 130 may recognize a signal light from an image being captured through the image sensor, and controls the output unit 140 to output the signal information of the recognized signal light. Furthermore, the controller 130 may control the RF communication unit to receive information indicating a signal change expected time, an expected time required to pass through a signal light, and an expected signal change frequency among the signal information of the signal light.

Furthermore, when any signal light is not recognized through the image sensor, the controller 130 may control to receive the signal information of a signal light through the RF communication unit and output it to the output unit.

Furthermore, the controller 130 may control the output unit to output the signal information of the signal light recognized through the image sensor by considering the moving state of a vehicle. In other words, the controller may control the output unit to output the signal information when the moving state of a vehicle is a stopped state, for example.

Furthermore, the controller 130 may provide a multimedia module for reproducing multimedia files. The multimedia module may be implemented within the controller 130 or implemented separately from the controller 130.

The controller 130 may perform a pattern recognition processing to recognize a handwriting or drawing input on the touch screen as text or image.

Furthermore, in addition to the aforementioned constituent elements, the terminal may further include the following constituent elements to implement an embodiment disclosed in the present disclosure.

In other words, the terminal may include a user input unit 150, a memory 160, an interface unit 170, a power supply unit 180, and the like.

The user input unit 150 may generate input data to control the operation of the terminal. The user input unit 150 may be configured with a keypad, a dome switch, a touch pad (pressure/capacitance), a jog wheel, a jog switch, and the like.

The memory 160 may store a program for processing and controlling of the controller 130, or may temporarily store input/output data (e.g., phonebook messages, still images, video, etc.) The memory 160 may store data related to various patterns of vibrations and audio output upon a touch input on the touch screen.

The memory 160 may include at least any one of storage mediums such as a flash memory type, a hard disk type, a multimedia card micro type, a card type memory (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. The terminal 100 may manage a web storage performing a storage function of the memory 160 on the Internet.

The interface unit 170 may be implemented to interface the terminal 100 with all external devices connected thereto. The interface unit 170 may receive data or power from an external device to deliver it to each component in the terminal 100, or transmit data from the terminal 100 to an external device. For example, the interface unit 170 may include, for example, wired/wireless headset ports, external charger ports, wired/wireless data ports, memory card ports, ports for coupling devices having an identification module, audio Input/Output (I/O) ports, video Input/Output (I/O) ports, earphone ports, and the like.

The identification module may be configured as a chip for storing various information for authorizing the authority to use the terminal 100, which may include a User Identity Module (UIM), a Subscriber Identity Module (SIM), and the like. The device having the identification module (hereinafter, referred to as "identification device") may be implemented in a type of smart card. Hence, the identification device can be coupled to the terminal 100 via a port.

The interface unit 170 may serve as a path for power to be supplied from an external cradle to the terminal 100 when the terminal 100 is connected to the external cradle or as a path for transferring various command signals inputted from the cradle by a user to the terminal 100. Such various command signals or power inputted from the cradle may operate as signals for recognizing that the terminal has been accurately mounted on the cradle.

The power supply unit 180 receives external power and internal power under the control of the controller 130 to provide power required for the operation of various components.

Various embodiments described herein may be implemented in a recording medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein.

In some cases, such embodiments described herein may be implemented by the controller 130 itself.

For software implementation, the embodiments such as procedures or functions described herein may be implemented with separate software modules. The software modules may perform at least one function or operation described herein. Software codes can be implemented by a software application written in any suitable programming language. The software codes may be stored in the memory 160 and executed by the controller 130.

Hereinafter, embodiments associated with a control method that can be implemented in a terminal having the foregoing configuration will be described in detail with reference to the accompanying drawings. The following embodiments may be used in a single or combined manner. Furthermore, the following embodiments may be also used in combination with the foregoing user interface (UI).

Method of Outputting the Signal Information of Signal Light

FIGS. 2A and 2B are flow charts illustrating a method for outputting the signal information of a signal light located outside according to an embodiment of the present disclosure.

First, the terminal 100 collects the signal information of a signal light located outside through the collection unit 110 (S210).

Here, the terminal 100 may control the activation or deactivation of the collection unit 110 to collect the signal information of a signal light being collected through the collection unit 110 only in a specific condition. Here, an example of the specific condition may be a case where an Idle Stop and Go (ISG) function is on (or activated).

Here, the terminal 100 may collect the signal information through the image sensor 111-1 and/or radio frequency (RF) communication unit 112. Here, when the terminal 100 receives the signal information of a signal light through the RF communication unit 112, various types of wireless communication schemes may be used. Hereinafter, however, a case in which signal information is received through a visible light communication scheme will be described as an example.

The signal information may include a signal state of the signal light, a signal change expected time, an expected time required to pass through a place located with a signal light from a place located with the terminal (or vehicle), and an expected signal change frequency. Furthermore, the signal state of the signal light may indicate a stop signal and/or a start signal, and the start signal may be a left turn signal, a U-turn signal, or a straight ahead signal.

Subsequently, the terminal 100 outputs signal information collected through the collection unit 110 via the output unit 140 (S220). Here, the 100 may output the collected signal information in a visual, auditory or tactile manner.

Hereinafter, a method for allowing the terminal 100 to output the signal information of a signal light located outside using the image sensor 111-1 will be described with reference to FIG. 2B.

Referring to FIG. 2B, the terminal 100 captures an image through the image sensor 111-1 (S211). Subsequently, the terminal 100 recognizes a signal light from the captured image (S212) to acquire the signal information of the recognized signal light (S213).

Subsequently, the terminal 100 outputs the acquired signal information through the output unit 140.

Furthermore, the terminal 100 may receive the signal information of a signal light through the image sensor and RF communication unit to output the received signal information via the output unit.

For example, the terminal 100 may acquire a signal state of the signal light through the image sensor, and may acquire supplementary information, such as a signal change expected time of the signal light, an expected time required to reach the signal light, and an expected signal change frequency, through the RF communication unit, to output the signal information.

Furthermore, the terminal 100 may receive the signal information of a signal light through the RF communication unit when the signal light is not recognized through the image sensor or when the signal light is recognized through the image sensor but the signal information of the signal light is not recognized. In this case, the terminal may receive the signal information through a visible light communication scheme.

The method of receiving the signal information of a signal light located outside through visible light communication will be described in detail with reference to FIG. 4 which will be described later.

Figure 3:
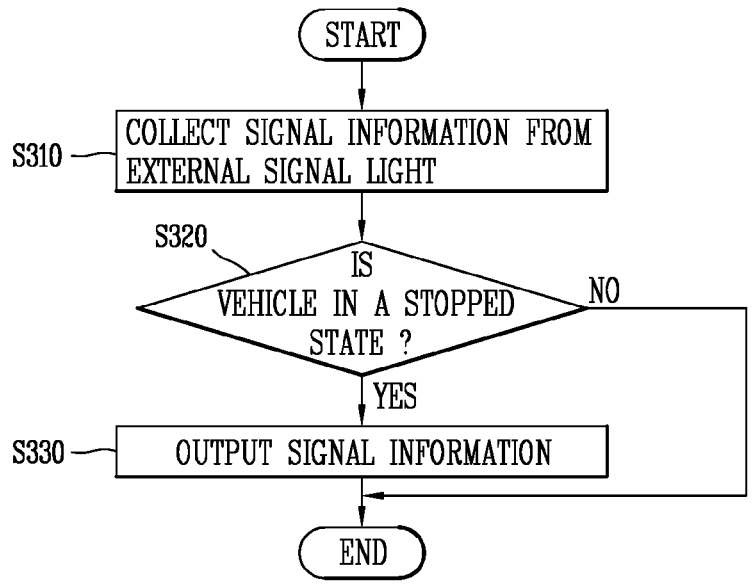
FIG. 3 is a flow chart illustrating a method for outputting the signal information of a signal light located outside by considering the moving state of a vehicle according to another embodiment of the present disclosure.

FIG. 3 is a flow chart illustrating a method for outputting the signal information of a signal light located outside by considering the moving state of a vehicle according to another embodiment of the present disclosure.

Referring to FIG. 3, the terminal 100 receives signal information from a signal light located outside (S310).

In this case, as described above, the terminal may receive signal information corresponding to the signal light through an image sensor and/or a wireless communication scheme.

Subsequently, the terminal 100 senses the moving state of a vehicle, whether or not the vehicle is moved. In other words, the terminal senses the moving state of a vehicle or terminal using the sensing unit to determine whether to output the received signal information (S320).

Here, the moving state of a vehicle refers to a stopped state (including waiting for signal), a slow moving state, or a moving state.

In other words, the terminal 100 may output the received signal information only when the vehicle is in a specific state (for example, in a stopped state) by considering the moving state of the vehicle (S330).

Upon sensing that the moving state of a vehicle or terminal is a stopped state through the sensing unit 120, the terminal 100 outputs the received signal information. In this case, the terminal may turn on the output unit to output an image or DMB on the output unit, and output the received signal information together with an image being outputted through the output unit. In this case, the signal information may be outputted at a specific location (top, bottom, left, right or center), and outputted to be distinguished from the output image.

Here, when the terminal 100 senses that the movement of a terminal or vehicle has been stopped may denote a case where the Idle Stop and Go (ISG) function is activated (or on).

As another embodiment, the ISG function may be activated (turned on) or deactivated (turned off) according to the signal information (signal state) of a signal light being received by the terminal.

For example, ISG may be activated when the signal state of a signal light indicates a stop signal, but ISG may be deactivated when the signal state of a signal light indicates a start signal such as straight ahead, left-turn, or the like.

Method of Receiving the Signal Information of Signal Light

Figure 4:
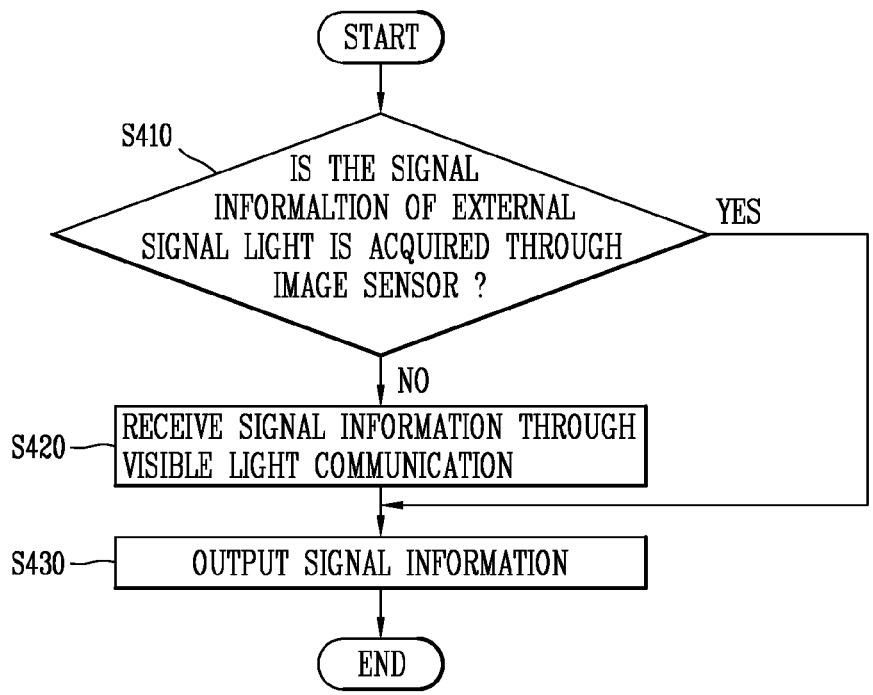
FIG. 4 is a flow chart illustrating a method for outputting the signal information of a signal light located outside according to still another embodiment of the present disclosure.

FIG. 4 is a flow chart illustrating a method for outputting the signal information of a signal light located outside according to still another embodiment of the present disclosure.

FIG. 4 illustrates a method of receiving and outputting the signal information of an external signal light using a wireless communication (for example, visible light communication) scheme when the terminal 100 is unable to acquire the signal information of an external signal light through the image sensor.

Referring to FIG. 4, when the terminal 100 is unable to sense a signal light located outside through the image sensor 111-1 or unable to receive signal information from an external signal light sensed through the image sensor (S410), the terminal 100 may receive the signal information of a signal light located outside through visible light communication.

Here, when the terminal 100 is unable to sense a signal light located outside through the image sensor 111-1 may denote a case where the external signal light does not exit within a capturing region of the image sensor, for example, a case where the external signal light is located immediately above or at the rear of the terminal or vehicle.

In this case, the terminal 100 receives the signal information of the external signal light through the RF communication unit 112 (S420).

Subsequently, the terminal 100 outputs the signal information received through the RF communication unit via the output unit 140 (S430). Here, the terminal may output signal information being received through the RF communication unit to the output unit by considering the moving state of a vehicle (for example, the moving state of a vehicle is a stopped state) as illustrated in FIG. 4.

Furthermore, the terminal 100 may additionally receive the signal information of the external signal light through the RF communication unit even when the signal information of the external signal light can be received through the image sensor, thereby acquiring more accurately customized signal information.

In other words, in addition to signal information being acquired through the image sensor, the terminal 100 may additionally acquire information, for example, a distance from a current vehicle location to the external signal light and an expected required time, a signal change expected time of the signal light, and the like, through the RF communication unit.

Display Signal Information

Figure 5A:
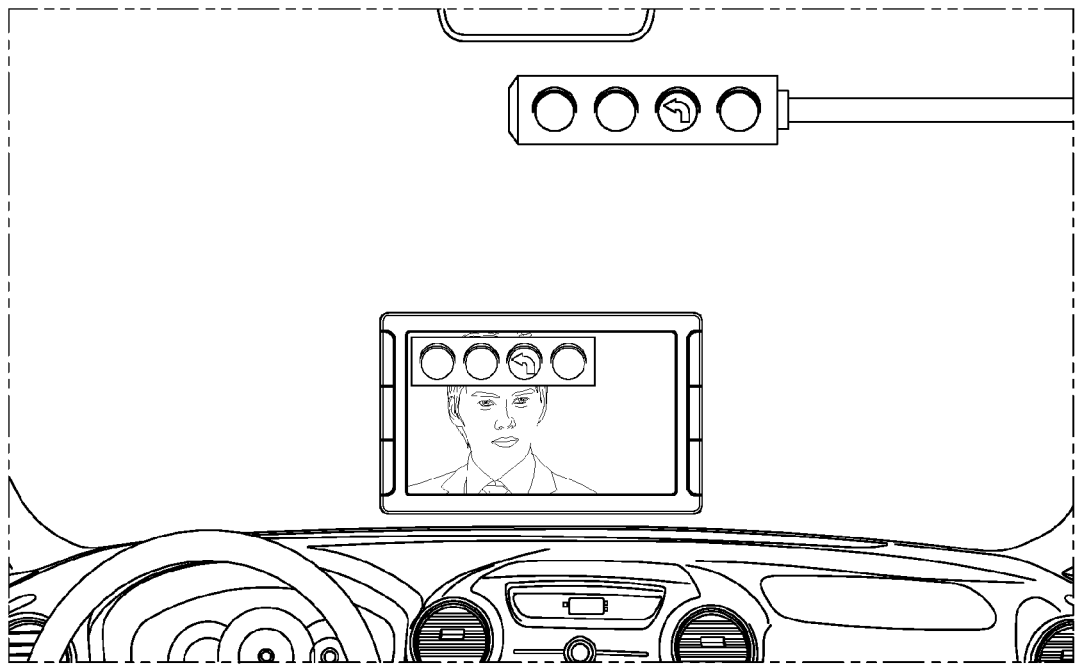
FIGS. 5A through 5C illustrate examples of displaying the signal information of a signal light located outside according to an embodiment of the present disclosure.
Figure 5B:
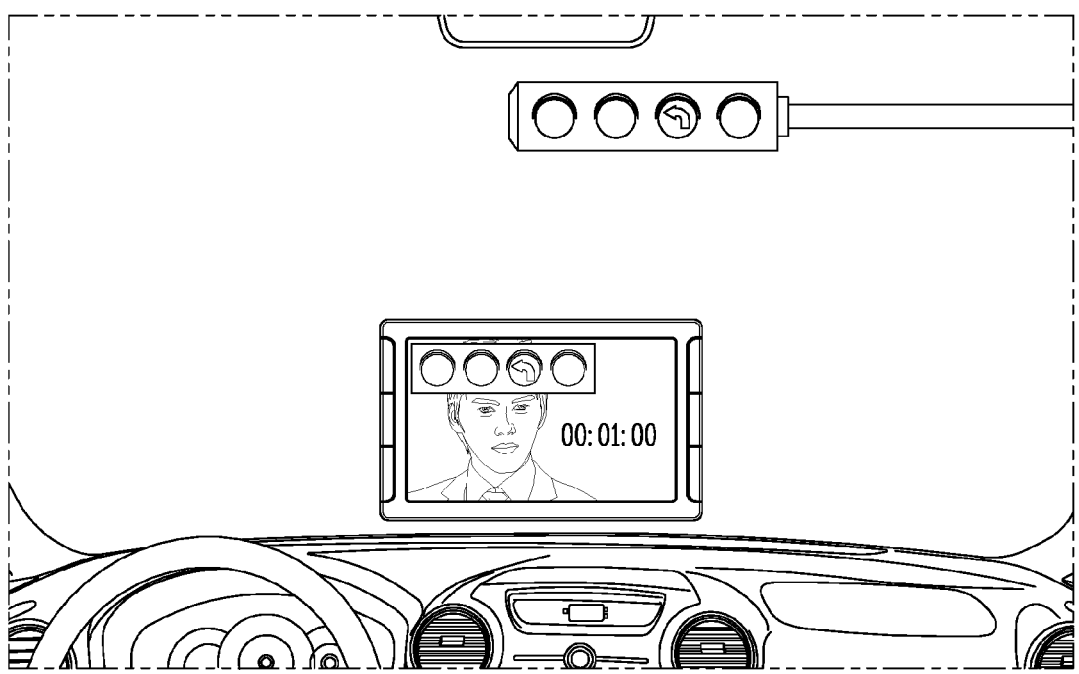
Figure 5C:
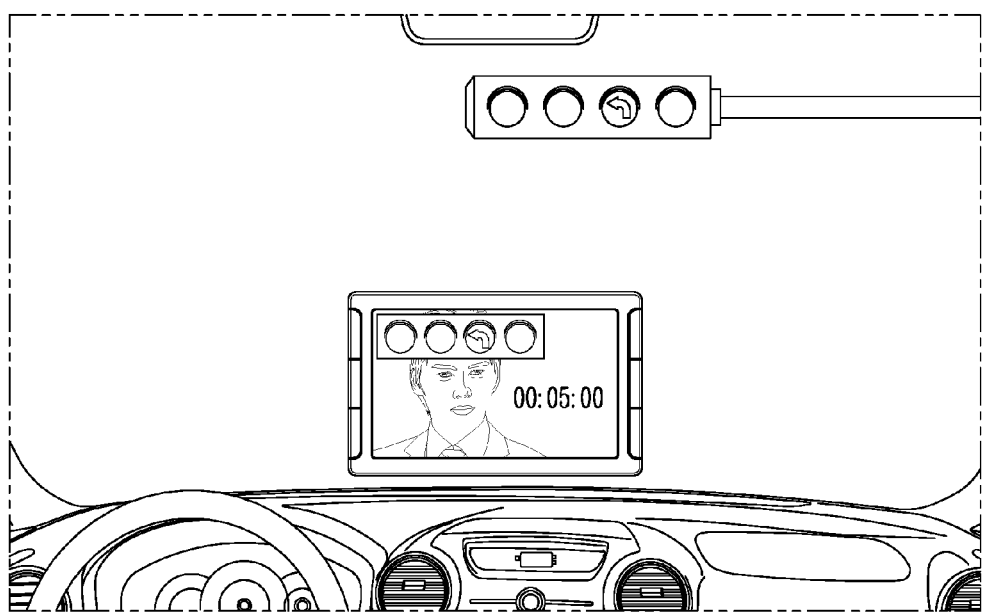

FIGS. 5A through 5C illustrate examples of displaying the signal information of a signal light located outside according to an embodiment of the present disclosure.

The terminal 100 collects the signal information of a signal light located outside to output the collected signal information through the output unit.

Here, the terminal 100 may visually display the collected signal information through a display unit.

In other words, as illustrated in FIG. 5A, signal information displayed on the display unit indicates a left turn sign as a current signal state of the external signal light.

In addition, the signal state of the signal light may indicate a straight ahead signal, a U-turn signal, a stop signal or the like.

Furthermore, when an image such as video or DMB is being outputted through the display unit, the terminal 100 may display the signal information at the top, bottom, center or both lateral surfaces (in an overlapped manner) of the output image.

Referring to FIG. 5B, the terminal 100 may display signal information including a signal change expected time of the external signal light as well as a current signal state of the signal light.

In other words, the terminal 100 may display a current signal state of the signal light "left turn sign" and a "signal change expected time" indicating that the left turn indication signal is changed after "00:01:00 (1 minute)" at the same time.

Referring to FIG. 5C, the terminal 100 may display signal information including a signal state of the external signal light, an expected time required to reach a place located with the signal light from a place located with the vehicle, and/or an expected signal change frequency.

In other words, the terminal 100 may display a signal state of the signal light "left turn sign", and information indicating that an expected time required to reach the signal light displayed with a left turn signal is "00:05:00 (5 minutes)" or three times of signal changes are expected to pass through the signal light.

Display Road Guide Information Using Signal Information

Figure 6A:
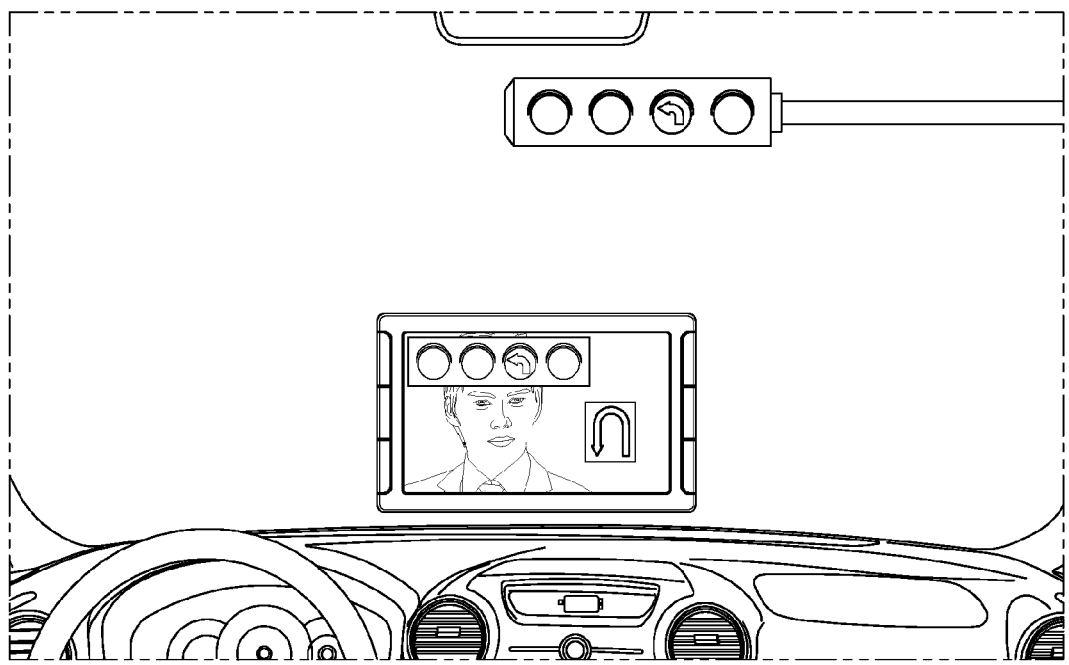
FIGS. 6A and 6B illustrate examples of outputting road guide information through the signal information of a signal light located outside according to another embodiment of the present disclosure.
Figure 6B:
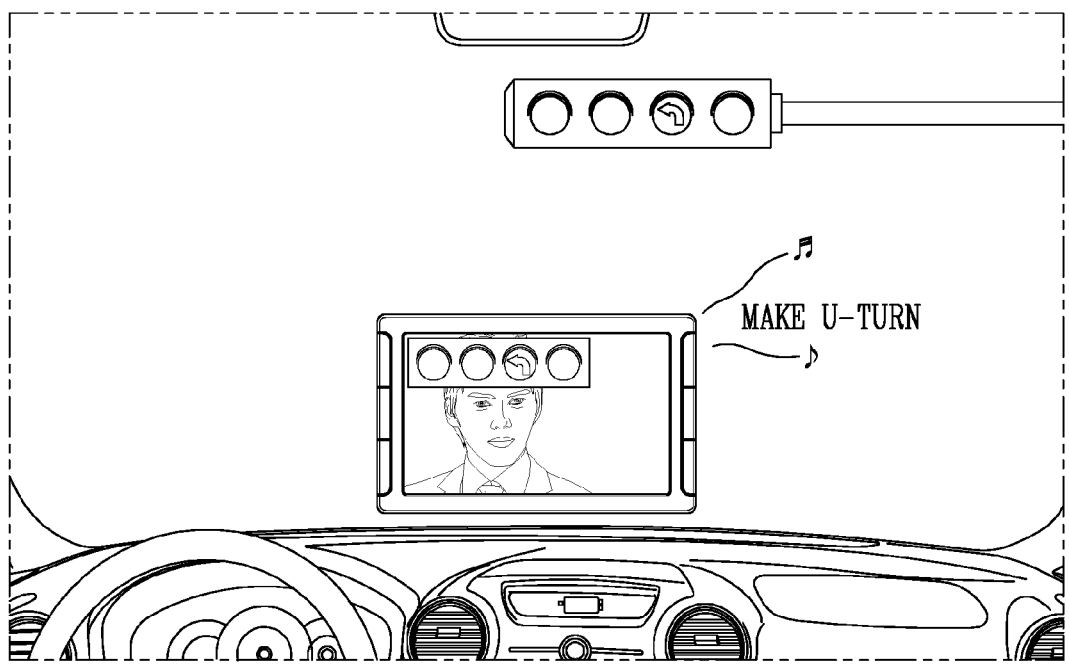

FIGS. 6A and 6B illustrate examples of outputting road guide information through the signal information of a signal light located outside according to another embodiment of the present disclosure.

FIG. 6A is a view illustrating that road guide information is displayed on a display unit, and FIG. 6B is a view illustrating that road guide information is outputted as a voice.

Referring to FIGS. 6A and 6b, when a navigation related application program is executed by using signal information collected from an external signal light, namely, a signal state of the signal light, the terminal 100 may provide road guide information by interlocking it with a signal state of the signal light.

In other words, as illustrated in FIGS. 6A and 6B, when the navigation related application program is to provide road guide information indicating U-turn at a current point of time during the path guidance, the terminal 100 may display the road guide information indicating U-turn on the display unit (refer to FIG. 6A) or output it as a voice (refer to FIG. 6B) when the collected signal state of the signal light indicates a U-turn allowed signal (for example, a left turn signal or stop signal).

The above-described embodiments and modification examples may be combined with one another. Accordingly, each embodiment may not be implemented as a single but implemented in combination with one another when the need arises. Such combinations can be easily implemented by those skilled in the art reading this specification and the combinations thereof will not be described below in detail.

However, even if not described, it should be understood that the combinations thereof will not be excluded from the present invention, and still fall within the scope of the present invention.

The foregoing embodiments and modification examples may be implemented through various means. For example, the embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like, which performs the functions or operations as described above. The software codes may be stored in a memory unit to be driven by a processor. The memory unit may be located at an inner or outer portion of the processor to send and/or receive data to and/or from the processor by various publicly-known means.

For example, the method according to the present invention as described above may be implemented by software, hardware, or a combination of both. For example, the method according to the present invention may be stored in a storage medium (for example, internal memory, flash memory, hard disk, and so on), and may be implemented through codes or instructions in a software program that can be performed by a processor (for example, internal microprocessor).

Furthermore, the controller 130 may include an application-specific integrated circuit (ASIC), other chip sets, a logic circuit and/or data processing device.

When the embodiment is implemented by software, the foregoing technique may be implemented by a module (process, function, etc.) performing the foregoing function. The module may be stored in a memory and implemented by the controller.

Furthermore, it should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

In the foregoing embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments. In addition, it will be apparent that an embodiment may be configured by a combination of claims cited by each other and a new claim may be included by the amendment after filing the application.

What is claimed is:

1. A terminal configured to be operated in a vehicle, the terminal comprising:
   an output unit;
   an image sensor configured to capture an image;
   a controller functionally connected to the output unit and the image sensor; and
   a sensing unit functionally connected to the controller and configured to sense a moving state of the vehicle,
   wherein the controller is configured to:
   recognize a signal light on the image captured by the image sensor,
   output signal information corresponding to the recognized signal light to the output unit when the sensed moving state of the vehicle is a stopped state, and
   restrict output of the signal information when the sensed moving state of the vehicle is a moving state or a slow moving state,
   wherein the signal information comprises at least one of a signal state of the signal light, a signal change expected time, an expected time required to pass through the signal light from a current location, and an expected signal change frequency.

2. The terminal of claim 1, further comprising:
   a radio frequency (RF) communication unit,
   wherein the controller controls to receive the signal information or information excluding the signal state of the signal light within the signal information through the RF communication unit.

3. The terminal of claim 2, wherein the signal information received through the RF communication unit is received through a visible light communication scheme.

4. The terminal of claim 1, wherein the signal state of the signal light indicates a stop signal and/or a start signal, and the start signal is a left turn signal, a U-turn signal, or a straight ahead signal.

5. The terminal of claim 4, wherein the controller controls an Idle Stop and Go (ISG) function to be activated when the signal state of the signal light indicates a stop signal.

6. The terminal of claim 1, wherein the controller controls the image sensor to be activated when the Idle Stop and Go (ISG) function is on.

7. The terminal of claim 1, wherein the controller controls an output image to be outputted on the output unit, and the signal information is output together with the output image.

8. The terminal of claim 7, wherein the controller controls the output unit to turn off the output image and the signal information when the moving state of the vehicle is the moving state or the slow moving state.

9. The terminal of claim 2, wherein the controller controls the RF communication unit to receive the signal information through the RF communication unit when a predetermined condition is satisfied.

10. The terminal of claim 9, wherein the predetermined condition is a condition where no signal light can be recognized by the controller.

11. The terminal of claim 7, wherein the controller controls the output unit to output the signal information at a top, bottom, left, right or center of the output image.

12. The terminal of claim 1, wherein the terminal is a navigation device, a laptop, a mobile device, Personal Digital Assistants (PDAs), a Portable Multimedia Player (PMP) or a tablet PC.

13. The terminal of claim 1, wherein the controller controls the output unit to output the signal information in a visual, auditory or tactile manner.

14. The terminal of claim 1, wherein, when a plurality of signal lights are recognized through the image sensor by the controller, the controller controls the output unit to output signal information of one of the plurality of signal lights based on a distance and/or direction of the one of the plurality of signal lights with respect to others of the plurality of signal lights.

15. A method for controlling the signal information of a signal light located outside to be output on a terminal configured to be operated in a vehicle, the method comprising:
   capturing, by the terminal, an image containing the signal light;
   sensing, by the terminal, the signal light from the captured image;
   receiving, by the terminal, signal information corresponding to the sensed signal light;
   sensing a moving state of the vehicle;
   outputting, by the terminal, the signal information corresponding to the sensed signal light when the sensed moving state of the vehicle is a stopped state; and
   restricting output of the signal information when the sensed moving state of the vehicle is a moving state or a slow moving state,
   wherein the signal information comprises at least one of a signal state of the signal light, a signal change expected time, an expected time required to reach the signal light, and an expected signal change frequency.

16. The method of claim 15, wherein the signal information is received through a visible light communication scheme.

* * * * *